(No Model.)
R. S. WARING
ELECTRIC CABLE.
No. 268,060. Patented Nov. 28, 1882.
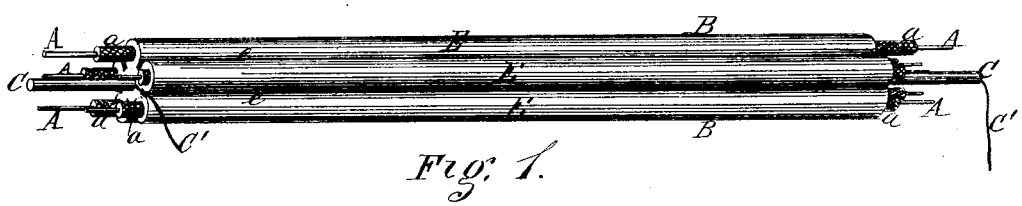
Fig. 1.
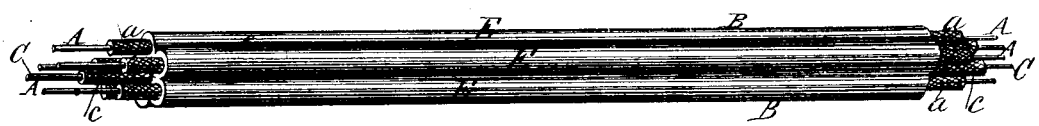
Fig. 2.
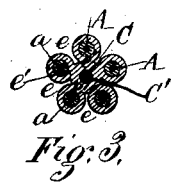  
Fig. 3.   Fig. 4.   Fig. 5.
Witnesses
C. L. Parker
R. H. Whittlesey
Inventor Richard S. Waring
By Attorney George H. Christy

UNITED STATES PATENT OFFICE.

RICHARD S. WARING, OF PITTSBURG, PENNSYLVANIA.

ELECTRIC CABLE.

SPECIFICATION forming part of Letters Patent No. 268,060, dated November 28, 1882.

Application filed September 27, 1881. (No model.)

*To all whom it may concern:*

Be it known that I, RICHARD S. WARING, of Pittsburg, county of Allegheny, State of Pennsylvania, have invented or discovered a new and useful Improvement in Electric Cables; and I do hereby declare the following to be a full, clear, concise, and exact description thereof, reference being had to the accompanying drawings, making a part of this specification, in which—like letters indicating like parts—

Figures 1 and 2 are perspective views of sections or portions of different forms of my improved electric-wire conductor. Fig. 3 is a transverse sectional view of the form shown in Fig. 1. Fig. 4 is a similar view of the form shown in Fig. 2; and Fig. 5 is a sectional view, illustrating another modification in the form of my conductor.

My invention relates to lead-covered electric cables of the class known as "round" as distinguished from flat cables, in which the conducting-wires are embedded in the body of lead covering. The round form of cable is desirable for several reasons, and especially on account of economy of space and lead required; but as heretofore made they have been objectionable for want of sufficient flexibility to enable them to be bent and again straightened with ease and safety to the cable, or to be reeled and otherwise manipulated with convenience. This is due largely to the form of lead covering heretofore employed, by which the wires are bound together into one body in such manner that they cannot readily move or change with relation to each other, as required between the inner and outer surfaces, where a bend is made, so that in the case of a short bend there is danger of rupturing or injuring some of the wires; also, where such a cable is bent and again straightened there is considerable elongation and consequent reduction of the lead covering, which is liable to injure its effectiveness as a cable. These and similar difficulties have been such as to give a preference in use to flat lead cables, in which the wires are in or approximately in a common plane, notwithstanding the extra amount of lead required to cover them properly, and consequent increase in expense.

The purpose of my invention is to secure a lead cable of the class described which shall unite several conducting-wires into one body and still allow comparative freedom of adjustment or change of relative position between wires, whereby greater flexibility is secured in all directions, and also to so arrange the body of lead and the wires which are embedded therein that injurious stretching or reduction of the lead covering by repeated bending will be avoided, and this I do by forming longitudinal ribs or flutes on the surface of a central body, bar, or pipe, of lead or similar soft ductile metal or alloy, and within these ribs or flutes the wires are separately embedded, as hereinafter more fully described and claimed.

In the drawings, A represents electric circuit wires, suitably insulated by a non-conducting covering, *a*. These wires are arranged parallel and in circular order around a common center or core wire, C, and all are covered by and held within a common body, of lead, B, or equivalent soft ductile metal. In order to provide for bending such cable in any and all directions without injury to the lead covering or to the conducting-wires, the exterior surface of the lead covering is formed with longitudinal ribs or flutes E, within and under which the wires A are inclosed. The intervening grooves or depressions, *e*, not only reduce the area of lead covering in cross-section, and thus render it more flexible, but their special function in this invention is to permit the separate ribs or coverings of the wires A to yield somewhat with relation to each other, and thus relieve in a measure the strain which would otherwise be imposed by a short turn or bend. This is best secured in the preferred form of cable, Figs. 1 and 3, where the depressions *e* are made deep, leaving a comparatively narrow or thin connection, *e'*, between the ribs which inclose the conductors A and the central body of lead which incloses the central wire, C.

The tendency of a round bar or pipe is to take a flattened or elliptical form at the bending-section, and this tendency is facilitated by the ribbed or fluted form of exterior surface shown. There is also a tendency in the tube-like wire-passages to flatten or contract when bent, and thus compress the insolating-covering of the wires. If the lead covering is supported laterally by a solid body of metal, this compressing action upon the wires is often such as to endanger and sometimes destroy the insulation; but by grooving the surface of the cable between wires, as at $e$, such lateral resistance is removed. The wire-inclosing ribs or flutes can yield and change form readily, so that such compressing tendency is wholly or to a great degree neutralized; also, by using a central body of lead and covering the wires within ribs or flutes on its surface I avoid to a great degree the injurious stretching of the lead covering by repeated bending and straightening of the cable. This is owing to the fact that the central body of lead, by its superior resistance, will act as a stay, causing the surrounding wire coverings or flutes on the longer side of the bend to be upset when the cable is bent back or straightened, so that after such second bending or straightening the lead coverings or flutes will have approximately the same body and form as they had before bending, the amount of stretch in them being determined by the stretching of the central body, which, owing to its central position, is small.

The difficulties above mentioned are to a great degree peculiar to round cables, and are not characteristic of flat cables or of inflexible cables—for example, such as are covered with glass or similar inflexible material; and I consider the features of construction by which I overcome such peculiar difficulties an important improvement, by means of which the circular arrangement of wires embedded in lead in the form of round cables is made both practicable and desirable, since it not only covers a comparatively large number of wires with a minimum quantity of lead, but also it is equally flexible in all planes or directions. This feature of universal flexibility without injury to the conductors is in practice very important, and greatly facilitates handling and laying the cable, especially where frequent turns or bends in different directions are required, as in city streets and buildings.

Another important advantage secured, especially in the preferred form, Figs. 1 and 3, is the comparatively large extent of exterior surface surrounding each of the wires A, with which earth is in contact when the conductor is laid under ground, whereby any leakage or escape of electric force from any wire A will find immediate ground, and consequently will not affect other wires in the cable; also, the evils of induction are obviated, and at the same time the several wires are conveniently connected into one cable, grouped within comparatively small space, and a minimum quantity of lead is required for covering them, so as to afford the desired protection.

In order to secure the best results, as above described, the grooves $e$ should be made deep, with a comparatively light metallic connection, $e'$, between the flutes E and the central lead body. These features may be varied more or less, however—as, for example, as illustrated in Figs. 2 and 4—and still secure much greater flexibility in the cable than can be given with a full round outer surface; or, instead of making the flutes E rounded or lobe-shaped, they may be made pointed or star-shaped, as in Fig. 5, though for economy in the use of lead the rounded form is preferred, in which the wires A are surrounded with lead walls of substantially uniform thickness. Such a cable may be formed by means of a lead-press having a die adapted to give the described exterior form to the lead covering, and a tubular mandrel for passing wires to the die through the lead passage of the press, the lead covering being applied under pressure around the wires within the die in the usual manner of doing such work.

It is obvious that the central wire may be omitted, though I prefer to retain it or its equivalent, as it serves the purpose of a strengthening-wire for the cable. Such central wire may have an insulated covering, $c$, like the wire A, (see Figs. 2 and 4,) and in such case it may be used, when practicable, for an electric circuit-wire; but I prefer to use a naked central wire, C, (see Figs. 1, 3, and 5,) in direct contact with the lead covering B, in which case it will, in addition to strengthening the cable, also serve as a conductor for such electrical force as may leak or escape from any of the surrounding wires, proper connections $C'$ being made for such central wire to ground. Such ground-connections may be terminal, or at intermediate points in the length of the cable, depending upon the amount and distribution of electrical force employed on different parts of the cable. They may be made of wires $C'$, having direct connection with wire C; or, when the cable is suspended in air, suitable ground-connections may be had in many cases by attaching ground-wires to the lead covering B at proper intervals. Such combinations, however, of a central wire, C, with surrounding wires A, alone considered, are not claimed herein, but will form the subject-matter of a separate application for patent.

I claim herein as my invention—

1. A flexible electric cable having a lead body or center of circular form in cross-section, with a series of separate ribs or flutes extending longitudinally on its surface, and having insulated conducting-wires inclosed within and covered by the ribs, substantially as and for the purposes set forth.

2. A flexible electric cable having a central body of soft ductile metal, with a series of separate longitudinal flutes, E, divided from each other by grooves $e$, and connected to the central body along one side, as at $e'$, and having insulated conducting-wires inclosed within such flutes, substantially as and for the purposes set forth.

In testimony whereof I have hereunto set my hand.

RICHARD S. WARING.

Witnesses:
C. L. PARKER,
R. H. WHITTLESEY.